(12) United States Patent
Witt et al.

(10) Patent No.: US 10,714,758 B2
(45) Date of Patent: Jul. 14, 2020

(54) SPINODAL-BASED CO-CONTINUOUS COMPOSITES FOR HIGH PERFORMANCE BATTERY ELECTRODES

(71) Applicant: The Regents of the University of California, Oakland, CA (US)

(72) Inventors: Jessica Witt, Costa Mesa, CA (US); Ali Mohraz, Irvine, CA (US); Daniel Mumm, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 83 days.

(21) Appl. No.: 15/744,046

(22) PCT Filed: Jun. 10, 2016

(86) PCT No.: PCT/US2016/037040
§ 371 (c)(1),
(2) Date: Jan. 11, 2018

(87) PCT Pub. No.: WO2016/201339
PCT Pub. Date: Dec. 15, 2016

(65) Prior Publication Data
US 2018/0375104 A1  Dec. 27, 2018

Related U.S. Application Data

(60) Provisional application No. 62/175,150, filed on Jun. 12, 2015.

(51) Int. Cl.
*H01M 4/80* (2006.01)
*H01M 4/04* (2006.01)
*H01M 4/66* (2006.01)
*H01M 10/34* (2006.01)
*H01M 4/70* (2006.01)
*H01M 4/02* (2006.01)

(52) U.S. Cl.
CPC .......... *H01M 4/80* (2013.01); *H01M 4/0404* (2013.01); *H01M 4/0471* (2013.01); *H01M 4/661* (2013.01); *H01M 4/667* (2013.01); *H01M 4/70* (2013.01); *H01M 10/345* (2013.01); *H01M 2004/021* (2013.01); *H01M 2004/028* (2013.01)

(58) Field of Classification Search
CPC ............ H01M 4/80; H01M 4/04; H01M 4/66; H01M 10/34
See application file for complete search history.

(56) References Cited

U.S. PATENT DOCUMENTS

| 2008/0125500 | A1* | 5/2008 | Cates | B01J 13/0056 516/99 |
| 2010/0068623 | A1* | 3/2010 | Braun | C25F 3/02 429/219 |

\* cited by examiner

*Primary Examiner* — Kenneth J Douyette
(74) *Attorney, Agent, or Firm* — Dinsmore & Shohl LLP; John P. Teresinski

(57) ABSTRACT

Electrodes and methods of creating co-continuous composite electrodes based on a highly porous current collector are provided. In one embodiment, a method for creating an electrode includes depositing a thin layer of material on the polymer template, removing polymer material of the polymer template and depositing a second material. The method may also include controlling internal surface area per unit volume and the active material thickness of at least the second material to tune the electrochemical performance of the electrode. In one embodiment, a composite electrode is provided including interpenetrating phases of a metal current collector, electrolytically active phase, and electrolyte.

14 Claims, 7 Drawing Sheets

SPINODAL-BASED CO-CONTINUOUS COMPOSITES FOR HIGH PERFORMANCE BATTERY ELECTRODES

PRIORITY

This application claims priority to and is the National Stage filing of International Application No. PCT/US2016/037040, titled SPINODAL-BASED CO-CONTINUOUS COMPOSITES FOR HIGH PERFORMANCE BATTERY ELECTRODES filed on Jun. 10, 2016, which claims the benefit of U.S. Provisional Application No. 62/175,150 filed on Jun. 12, 2015, titled SPINODAL-BASED CO-CONTINUOUS COMPOSITES FOR HIGH PERFORMANCE BATTERY ELECTRODES, the content of which is expressly incorporated by reference in its entirety

STATEMENT OF GOVERNMENT SUPPORT

This invention was made with government support under Grant No. CMMI1301489, awarded by the National Science Foundation. The government has certain rights in the invention

BACKGROUND

High performance electrochemical storage devices can be divided into two main categories: batteries and supercapacitors. Batteries traditionally deliver high energy, but suffer when it comes to power delivery. On the other hand, supercapacitors are noted for having large power densities at the sacrifice of delivering sub-par energy. In order to meet future energy demands, the gap between batteries and supercapacitors must be bridged by creating devices that concurrently deliver both high energy and power.

FIG. 1 depicts a conventional pore structure. Three-dimensional porous composite electrodes are currently used in commercial applications, in particular for many battery chemistries including Nickel Metal Hydride (NiMH), Lithium Ion and Lead Acid. Most NiMH batteries utilize a nickel foam cathode to increase electrical conductivity. These nickel foams generally have 80-180 holes per inch, with an average hole diameter of ~0.25 mm. A layer of electrolytically active materials is then attached to the nickel foam in a slurry addition, creating a 3D composite electrode. This method was first patented by General Electric Company in 1967 with a desirous pore structure that contains about 100 pores per inch or pore sizes of about 250 µm. The Mitsubishi Materials Corporation in 1996 improved upon the initial design through considering pores on the range of 60 to 700 µm, thus slightly reducing the length that ions and electrons need to flow. This foam type architecture can be utilized in a variety of materials including nickel, copper, carbon based materials, and a range of other electron conducting phases.

In order to meet growing energy demands, there have been many attempts to improve foam morphology, through creating materials that have a more symmetric pore architecture and through reducing overall pore dimensions, enabling low-resistance transport paths for ion and electrons throughout the structure. These attempts all have drawbacks. FIG. 2 displays various different conventional architectures. Section 200 depicts a lithography defined microstructure, section 205 depicts a nanofoam architecture, section 210 depicts a nanowire based array, and section 215 depicts an inverse opal structure. Multi-beam laser lithography has been used to create nanostructures with a face centered cubic lattice and uniform pore distribution with pore sizes of about ~800 nm. The nanofoam architecture is composed of interconnecting fibers ranging from 100-1000 nm in diameter and porosity of 99%. Nanowire based architectures consist of aligned nanowires with uniform diameters that can range from ~1 nm to ~500 nm, and lengths as long as 1 µm. The inverse opal structure consists of pores that range from ~200 nm to ~10 µm depending on the initial spheres used to create the template, and offers uniform pore distribution.

Prior art methods suffer from major disadvantages. Regarding foams, the electrolytically active phase is deposited via a slurry addition, which fills the pores and does not allow for a percolating pathway for the electrolyte. The processing of foams, in combination with the large pore sizes (~0.25 µm) and pore distribution, creates long pathways for ions and electrons to transport, limiting the achievable power densities to that of traditional batteries.

Lithography defined structures have a uniform pore size distribution, but the pore size itself is not uniform. This limits the active material that can be deposited while also ensuring a percolating passage for each phase. Moreover, this method requires expansive techniques such as multi-beam laser interference lithography and argon plasma sputtering. The processing step also inhibits the thickness of the electrode to ~4 µm, limiting the total energy that can be stored in the device.

Regarding nanofoams, the diameters of the fibers that comprise the structure range over an order of magnitude producing pores and a pore distribution that are not uniform. Further deposition of an active material could then cause a blockage, not allowing the electrolyte to freely flow within the structure.

Regarding nanowires, due to the small diameter of these nanowires, they have a tendency to colligate together, creating non-uniform pores and pore distribution. As with other conventional methods, this can increase the resistive paths for ions and electrons, which in turn will limit the power density. Furthermore, the distance between the wires is very small, limiting the amount of active material that can be deposited and in turn, the energy density.

Regarding inverse opal structures, similar to lithography defined structures, the pore structure is non-uniform, limiting the amount of active material that can be deposited while still keeping a continuous path for the electrolyte. Additionally, this processing technique can only produce electrodes with a thickness of up to ~15 µm, limiting the total amount of stored energy. This method also requires extensive techniques such as evaporative deposition and electrodeposition.

BRIEF SUMMARY OF THE EMBODIMENTS

Disclosed and claimed herein are methods for creating a composite electrode, composite electrodes and batteries including a composite electrode. One embodiment is directed to a method for creating a composite electrode including depositing a layer of metal material on a polymer template to form a metal coated structure, wherein the polymer template is a porous structure having a uniform pore structure with a defined internal surface area per unit volume. The method also includes removing polymer material from the metal coated structure to form a metal shell, wherein the metal shell includes a uniform pore structure within the metal shell with an internal surface area per unit volume based on the polymer template. The method also includes depositing an active material on the metal shell to form a composite electrode, wherein thickness of the active material in the composite electrode is controlled to tune the electrochemical performance of the composite electrode.

In one embodiment, the polymer template is a bicontinuous interfacially jammed emulsion gel.

In one embodiment, the polymer template includes a uniform pore geometry with a uniform pore distribution.

In one embodiment, pores of the metal shell are uniform and range from about 5 µm to about 450 µm in length.

In one embodiment, removing the polymer includes sintering the metal coated structure.

In one embodiment, the metal shell is a nickel metal shell.

In one embodiment, the active material is Nickel/Nickel Hydroxide (Ni/Ni(OH)$_2$).

In one embodiment, the thickness of the active material is about 1 µm thick.

In one embodiment, performance of the composite electrode is based on the internal surface area per unit volume and thickness of the active material.

In one embodiment, electrochemical performance of the composite electrode is governed by independent tuning of pore diameter and thickness of the active material.

In one embodiment, the method includes forming the polymer template with a desired pore structure prior to the depositing the layer of metal material on the polymer template.

In one embodiment, the composite electrode is configured as a porous current collector.

In one embodiment, the composite electrode is configured as a cathode for a nickel metal hydride battery.

In one embodiment, thickness of the composite electrode is within the range of about 15 µm to about 500 µm.

Another embodiment is directed to a battery electrode including a composite electrode having a porous structure, the composite electrode formed by a metal structure having a uniform pore structure with a defined internal surface area per unit volume, and an active material coating the metal structure, wherein thickness of the active material in the composite electrode is controlled to tune the electrochemical performance of the composite electrode.

In one embodiment, the metal structure is formed by nickel.

In one embodiment, the pore geometry and distribution of the metal structure is tuned for electrochemical performance of the composite electrode.

In one embodiment, the active material coating is Nickel/Nickel Hydroxide (Ni/Ni(OH)$_2$).

In one embodiment, thickness of the composite electrode is within the range of about 15 µm to about 500 µm.

Another embodiment is directed to battery including an electrolyte, an anode electrode, and an cathode electrode. The cathode is a composite electrode having a porous structure, the composite electrode formed by a metal structure having a uniform pore structure with a defined internal surface area per unit volume, and an active material coating the metal structure, wherein thickness of the active material in the composite electrode is controlled to tune the electrochemical performance of the composite electrode.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
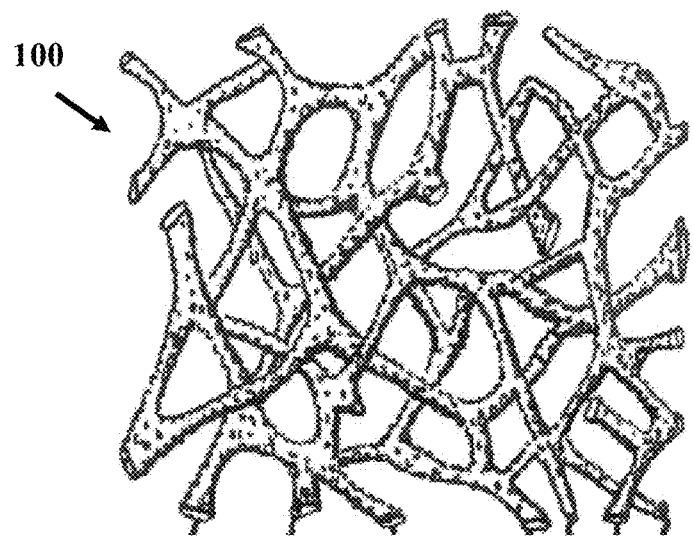
FIG. 1 depicts a conventional pore structure.
Figure 2:
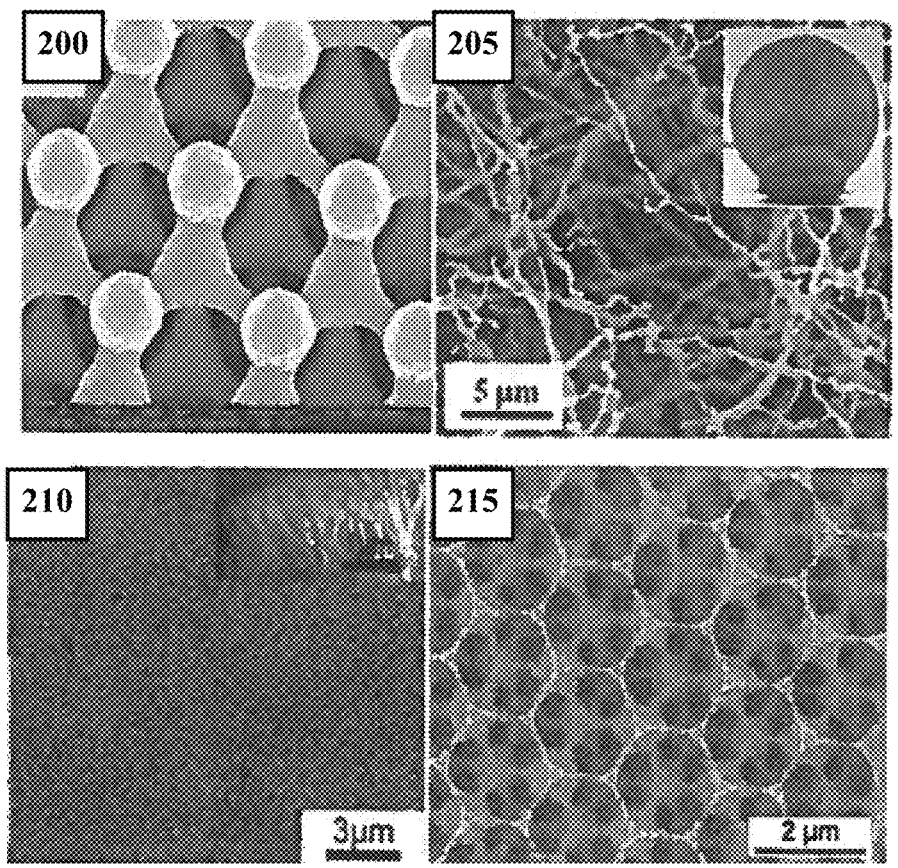
FIG. 2 depicts various different conventional architectures.

One aspect of the disclosure is directed to processes for creating composite electrodes with desired microstructure characteristics that govern electrostatic performance. In one embodiment, a process is provided that allows for independent tuning of pore diameter and active material thickness of the composite electrode. In that fashion, an electrode is provided that allows for efficient ion transport to electrochemically active sites throughout the entire electrode. Control of pore characteristics and active material thickness can be independently tuned based on one or more or the processes described herein.

In one embodiment, methods of creating co-continuous composite electrodes based on a highly porous current collector are provided. In one embodiment, a method includes creating an electrode by depositing a thin layer of material on the polymer template, removing the polymer material of the polymer template and depositing a second material. The method also includes controlling internal surface area per unit volume and the active material thickness of at least the second material to tune the electrochemical performance of the electrode. In one embodiment, the methods provide short pathways for ion and electron transport, as well as a systematic approach to tune the electrochemical properties of the electrode to produce electrochemical storage devices that simultaneously delivery high energy power densities. In one embodiment, the first step is creating a sacrificial bicontinuous polymer template that exhibits the unique morphological conditions of the embodiments. A conductive metal is then deposited onto the polymer template and the template is removed creating a composite electrode. The thickness of the active material can also be varied over a wide range (e.g., ½ of the pore diameter of less). As a result, a highly porous current collector is created from the co-continuous composite electrodes based on a highly porous current collector.

In one embodiment, a composite electrode is provided. The composite electrode may be prepared for inclusion in interpenetrating phases of a metal current collector, electrolytically active phase, and electrolyte. The composite electrode may be a highly porous current collector.

In one embodiment, a microstructural design can be used to create electrodes for a wide variety of electrochemical applications, especially where large energy and power densities are simultaneously required. By enhancing the transport kinetics within the microstructure through minimizing the travel length of ions and electrons, the overall electrochemical performance can be enhanced significantly. The synthesis technique described in the following sections is not limited to any certain chemistry, thus a wide variety of materials can be used. Through restructuring electrode architecture, traditional materials used in batteries or electrochemical supercapacitors can exhibit an increase in volumetric energy and power density, allowing for higher energy and power output, or miniaturization of these devices. The ability to provide more energy and power per a given volume is more important when considering the ever-growing energy demands and push towards miniaturization.

One aspect of the disclosure relates to designing an electrode architecture to enable a percolating path for ions and electrons to travel throughout the entire structure, to minimize the length and resistance of transport pathways, and to enable a large volumetric density of active materials. In one embodiment, a 3D electrode is provided that contains interpenetrating phases a metal current collector, electrolytically active phase, and electrolyte.

In one embodiment, a uniform pore geometry is provided. In comparison to conventional devices or methods which provided non-uniform pores, a uniform pore geometry may be provided by a co-continuous architecture. In one embodiment, the architecture offers pores of a uniform size throughout the entire device. This allows for efficient ion transport to the electrochemically active sites throughout the entire electrode.

Another aspect is directed to independent tuning of microstructural parameters that govern electrochemical performance. In one embodiment, the processing technique allows for independent tuning of the pore diameter and the active material thickness. The two control knobs (e.g., pore diameter and the active material thickness) mediate the overall electrochemical behavior of the system. Thus, with the ability to tune each of pore diameter and the active material thickness individually, the electrochemical performance can be tuned over wide range, with the possibility to tune a given performance characteristic.

Figure 3:
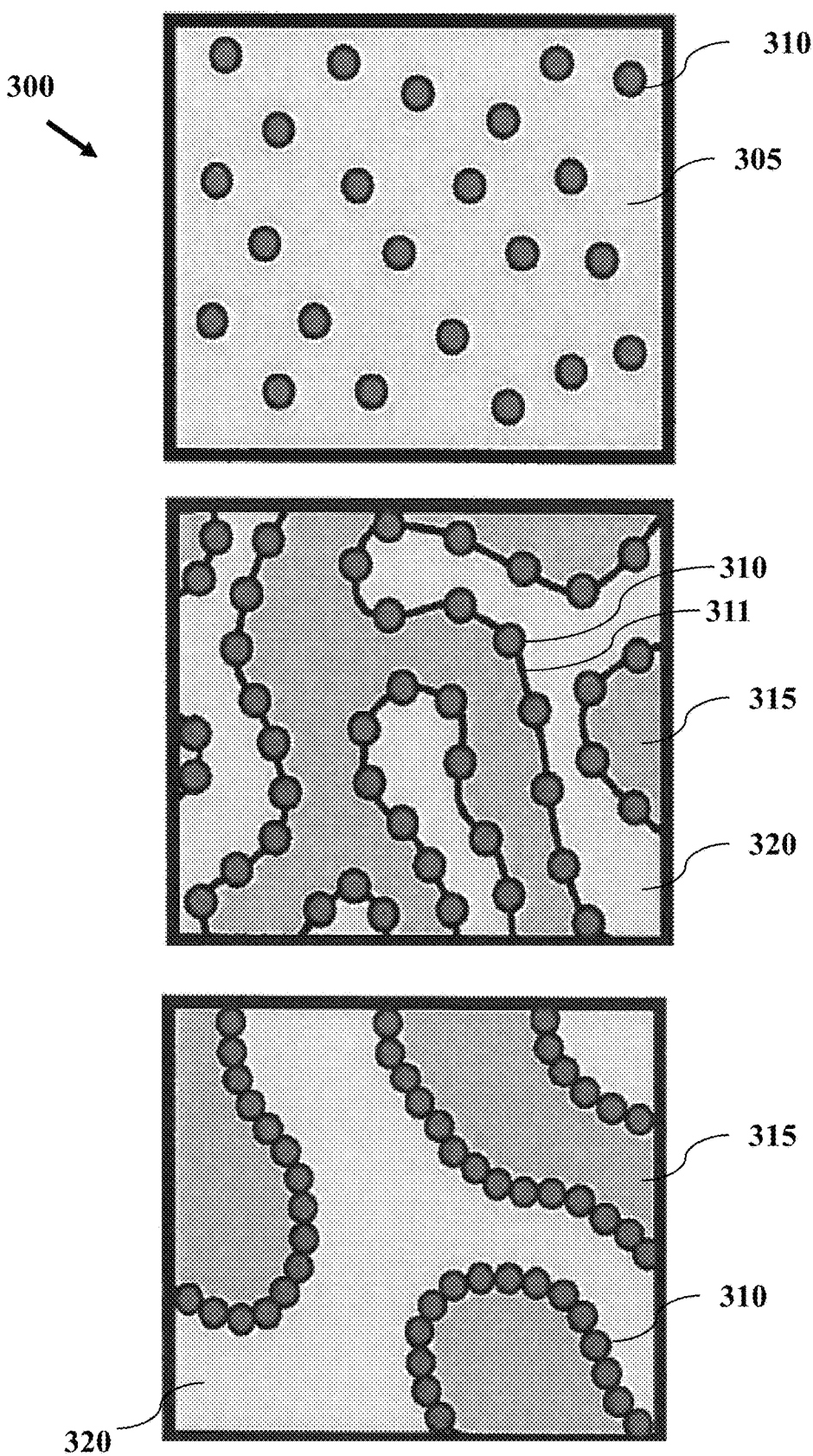
FIG. 3 depicts a graphical representation of bijel formation according to one or more embodiments.

FIG. 3 depicts a graphical representation of bijel formation according to one or more embodiments. According to one embodiment, bijel formation is used to generate a polymer template. Bijel formation as discussed herein can produce a unique morphologies to provide a uniform pore geometry. In one embodiment, a morphology described in this disclosure utilizes a class of soft materials known as bicontinuous interfacially jammed emulsion gels (e.g., bijels). The formation of these soft materials occurs through arrested phase separation of a binary liquid mixture 305 undergoing spinodal decomposition in the presence of neutrally wetting colloidal particles 310. During phase separation, the particles 310 absorb to the fluid-fluid interface 311, and the resulting soft material is comprised of two bicontinuous and interpenetrating fluid domains 315, 320. The subsequent self-similar domains can be tuned over wide range (e.g., ~5 µm to 405 µm) solely through the volume fraction of particles according to one embodiment, through varying characteristic domain size, the internal surface area per unit volume, here denoted as δ, is consequently varied. These soft materials can be transformed to a polymer template by exploiting the incompatible chemistries of the two fluid domains, through selectively polymerizing one phase, as shown in FIG. 4.

Figure 4:
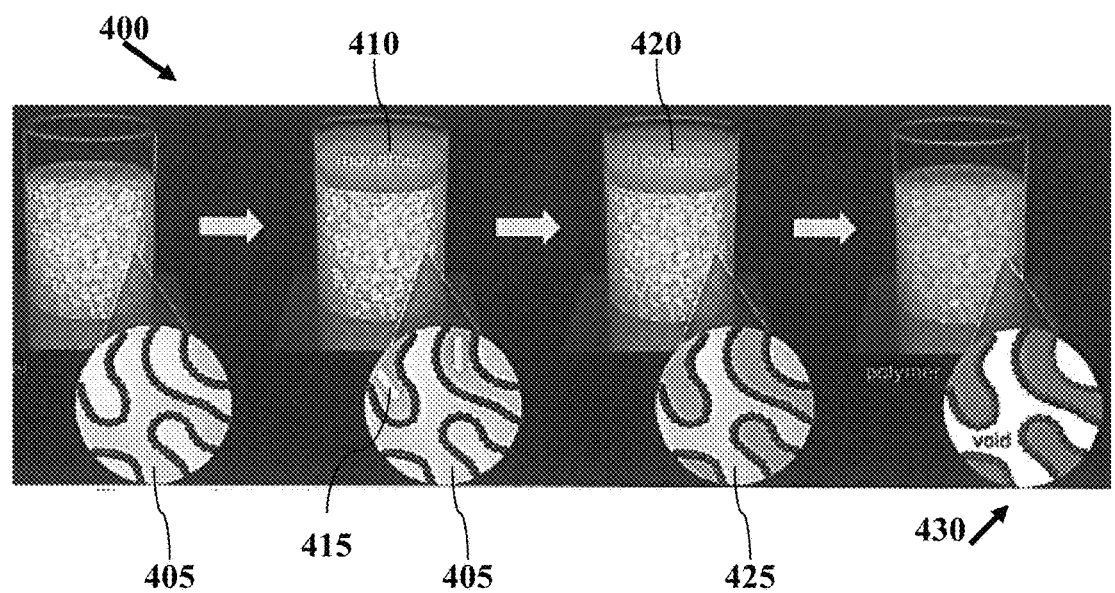
FIG. 4 depicts a process for creating a polymer template according to one or more embodiments.

FIG. 4 depicts a process 400 for creating a polymer template (e.g., scaffold) according to one or more embodiments. In one embodiment, a monomer 410 mixed with a photoinitiator is placed on top of the bijel 405 and allowed to equilibrate, shown as 415. Bijel templates are then formed through photopolymerization. For bijel formation, a variety of binary fluid systems that undergo spinodal decomposition and nanoparticles can be used. According to one embodiment, a critical solution of water/2,6-luitine and 697 nm fluorescent silica nanoparticles were used for bijel formation. The bijel was transformed into a bicontinuous polymer template through selectively polymerizing the lutidine phase with a hydrophobic monomer (1,6 hexanedioldiacrylate) mixed with a photoinitiator (Darocur 1173), shown as 420. Silica particles 425 are then removed through a quick hydrofluoric acid etch creating a polymer scaffold 430.

Figure 5:
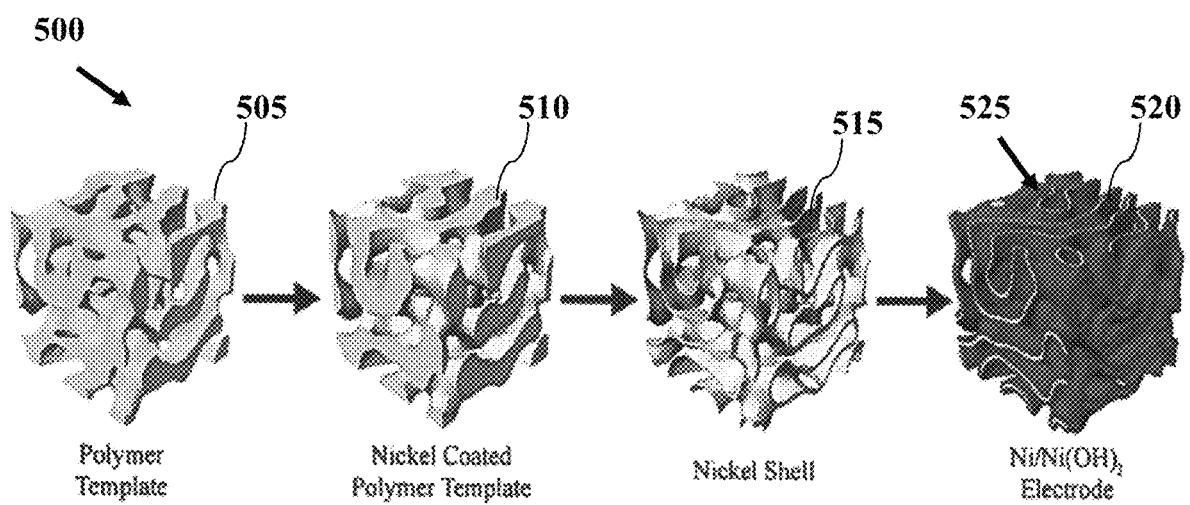
FIG. 5 depicts a process for creating a composite electrode according to one or more embodiments.

FIG. 5 depicts a process 500 for creating a composite electrode according to one or more embodiments. In one embodiment, FIG. 5 depicts steps to create co-continuous composite 520 according to one or more embodiments. For proof of concept and according to one embodiment, a Nickel/Nickel Hydroxide (Ni/Ni(OH)$_2$) electrode 520 was synthesized. However, processing techniques can be expanded beyond that of Nickel/Nickel Hydroxide (Ni/Ni(OH)$_2$) chemistries according to one or more embodiments, creating a general platform for the synthesis of electrochemical composites. In one embodiment, a thin coating of nickel is deposited on the polymer template 505 through electroless plating. According to one embodiment, the polymer template includes a uniform pore geometry and a co-continuous architecture. The plating procedure allows for a uniform 1 µm thick coating of nickel throughout the entire volume of polymer template 505, and does not require any expensive equipment, as is the case for electrodeposition. Nickel coated polymer template 510 is generated by the electroless plating of polymer template 505. In one embodiment, the polymer is removed through sintering in air at 500° C. for 4 hours, and subsequently sintering at 450° C. for 8 hours under H$_2$ (4% in Ar) to ensure reduction of the scaffold to pure nickel, such as nickel shell 515. In one embodiment, an active material, such as nickel hydroxide, is then deposited on nickel shell 515 through chemical bath deposition, and the length of this layer could be systematically controlled through this step. This processing step, like that of electroless plating procedure, does not require any expensive equipment and thus, is fairly low cost. This final step also provides the second control knob since this layer controls the ion transport path in the active layer of the Nickel/Nickel Hydroxide (Ni/Ni(OH)$_2$) electrode 520.

According to one embodiment, the ability to independently tune two control knobs (the internal surface area per unit volume and the active material thickness (δ)), allows for the ability to tune the electrochemical performance of an electrode for a certain design restraint. The effectiveness of the embodiments in regards to tuning the electrochemical performance is discussed below. Regarding uniform pore geometry and pore distribution, the embodiments offer a uniform pore geometry that also results in a uniform pore distribution. This ensures the percolating passages for every phase of the composite electrode, the current collector, the electrochemically active phase, and the electrolyte. Additionally, due to the uniform pore geometry, this design offers greater control of the amount of active material that can be deposited while still insuring connectivity of each phase throughout the volume.

Regarding short transport lengths for electrons, the embodiments offer one or more advantages. The pore size of the current collector can be an order of magnitude less than the prior art of the foam architecture. This allows for deposition of a thinner layer of active material while still maintaining a large volume fraction of active material. Thus, the pathways for ion and electron transport are decreased, increasing the power density. Through careful design of pore size and active material thickness, this design can offer the power density of a supercapacitor, with the energy density of battery, bridging the gap between two technologies.

Regarding independent tuning of the morphological parameters that govern electrochemical performance, the embodiments offer processes to allow for independent tuning of the pore size (which governs the internal surface area per volume) and the active material thickness. As such, a design is provided for next-generation electrodes to meet a wide variety of design constraints, including large energy and power densities.

Regarding cost, the embodiments offer lower cost solutions. Conventional methods require processing steps performed by expensive equipment. Embodiments described herein may be executed using an ultra violet lamp, which is relatively inexpensive. Additionally, the maximum temperature needed to remove the polymer is 500 Y C in certain embodiments, where as a temperature of 1000° C. is needed for lithography defined structures.

Regarding electrode thickness, many of the conventional techniques are limited to a maximum thickness of ~15 μm or less due to processing techniques. The embodiments offer much thicker electrodes ~500 μm. Limiting electrode thickness also limits the total energy that can be stored in the cell. Thus, in order to create devices with a greater amount of stored energy, the ability to create thick electrodes as offered by the embodiments is crucial.

Figure 6:
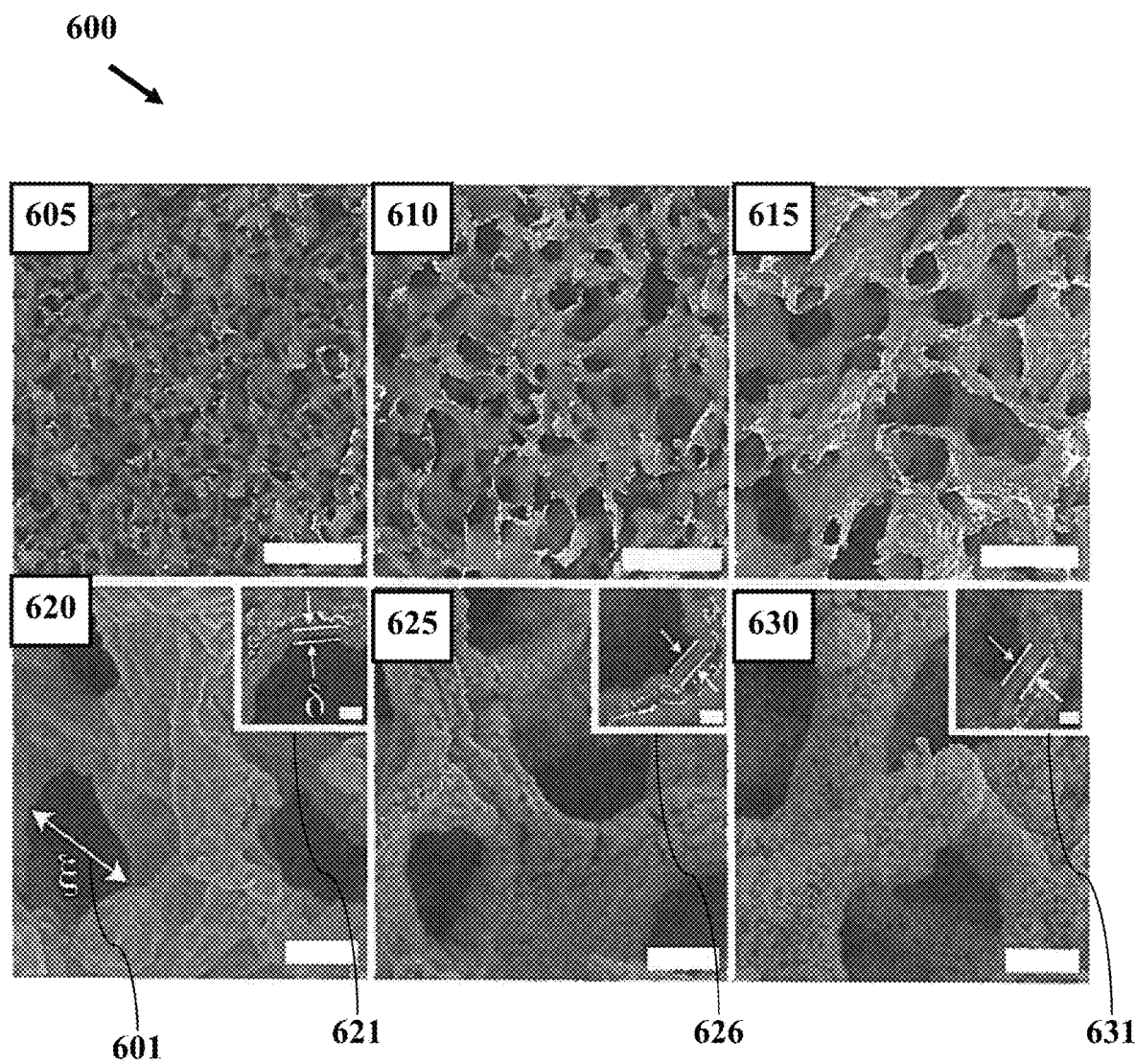
FIG. 6 depicts a graphical representation of independent tuning of domain size and material thickness according to one or more embodiments.

FIG. 6 depicts independent tuning of domain size and material thickness according to certain embodiments. In an exemplary embodiment, domain size and active material thickness were independently tuned for an array of electrodes with a domain size 601 of (8 μm<ξ<22 μm) and active material thickness (475 nm<ξ<1 μm) was fabricated.

FIG. 6 depicts the microstructure of 3D-bicontinuous electrodes 600. In sections 605, 610, 615, a bare nickel shell with 8 mm, 15 mm, and 22 mm domains are shown respectively. In sections 620, 625, 630 of FIG. 6, the 15 mm electrode with three different active material thicknesses of 475 nm, 675 nm, and 1 mm are shown respectively. The scale bars denote 25 mm for sections 605, 610, 615, 10 m for sections 620, 625, 630 and 1 mm for the insets 621, 626, 631 in sections 620, 625, 630.

Figure 7:
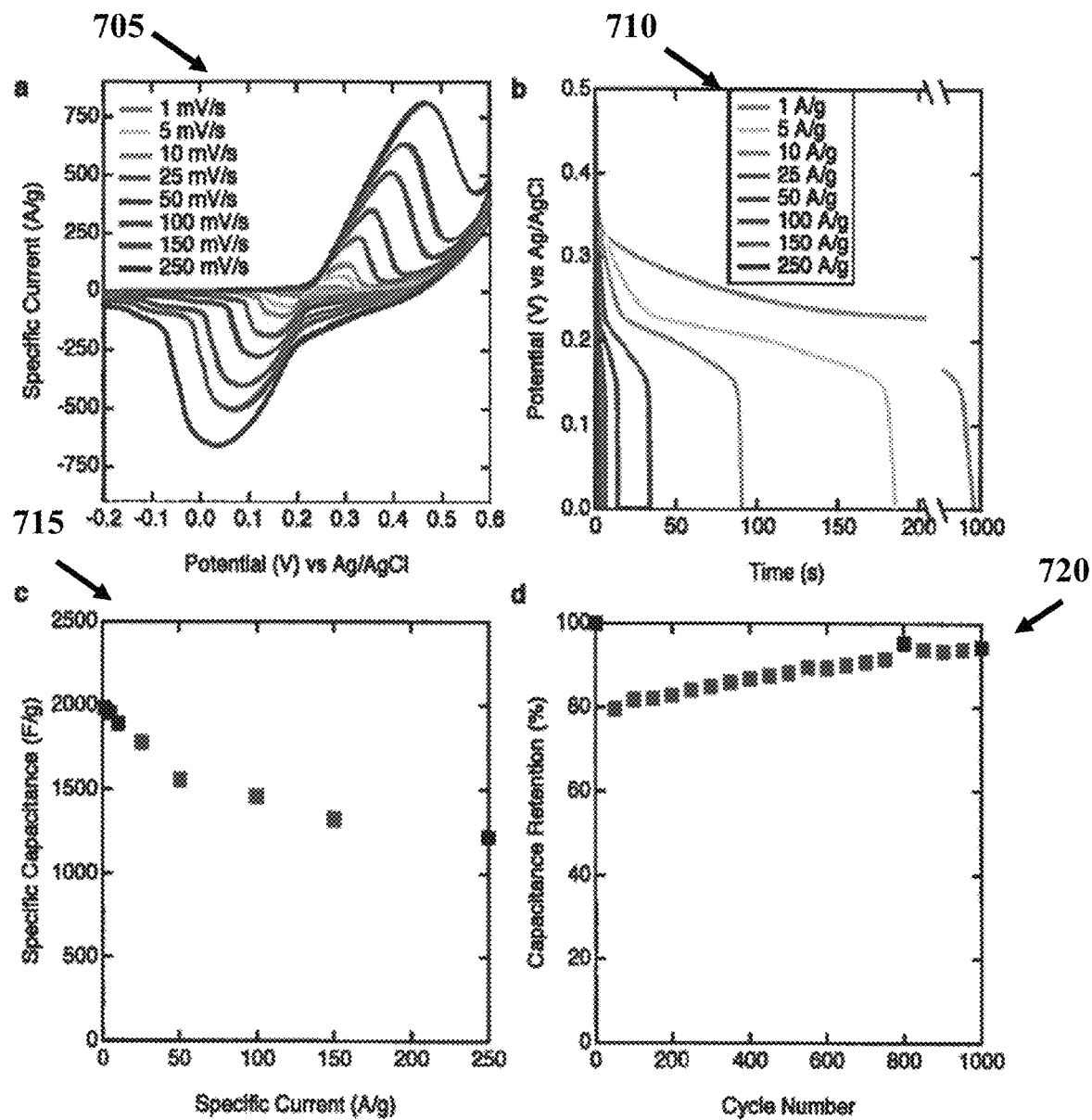
FIG. 7 depicts electrochemical measurements of a composite electrode according to one or more embodiments.

To explore the electrochemical characteristics of these electrodes, cyclic voltammetry and charge/discharge tests were performed for each electrode. These tests were performed in the three-electrode cell, with Ag/AgCl reference electrodes, platinum counter electrode, and 6M KOH as electrolyte. As a representative example, the results of the electrochemical tests for the electrode with ξ=22 and δ=675 are shown in FIG. 7. The CV curves show two clear peaks, corresponding to the oxidation and reduction of the active material according to the reversible reaction $Ni(OH)_2 + OH^- \leftrightarrow NiOOH + H_2O + e^-$. Specific capacitance values were then calculated from both the CV curves and the discharge curves, and a maximum gravimetric capacitance of 2148.5 F/g was achieved, close to the theoretical value of 2305 F/g. When increasing the discharge rate to 250 A/g, the specific capacitance decreased by only 39% (1310 F/g) from its maximum value. This demonstrates efficient use of the active material even at exceedingly large current densities. This electrode was cycled at a current density of 25 A/g for 1000 cycles, and the electrode maintained at least 80% of its original value throughout the 1000 cycles, demonstrating the excellent stability of the electrode.

FIG. 7 depicts electrochemical measurements of the 22/675 Nickel/Nickel Hydroxide (Ni/Ni(OH)$_2$) composite electrode. Section 705 of FIG. 7 depicts CV curves at various scan rates. Section 710 of FIG. 7 depicts galvanostatic discharge cures at various current densities. Section 715 of FIG. 7 depicts gravimetric capacitance as a function of current density. Section 720 of FIG. 7 depicts capacitance retention as a function of cycle number. Discharge rates are at 25 A/g for FIG. 7.

Figure 8:
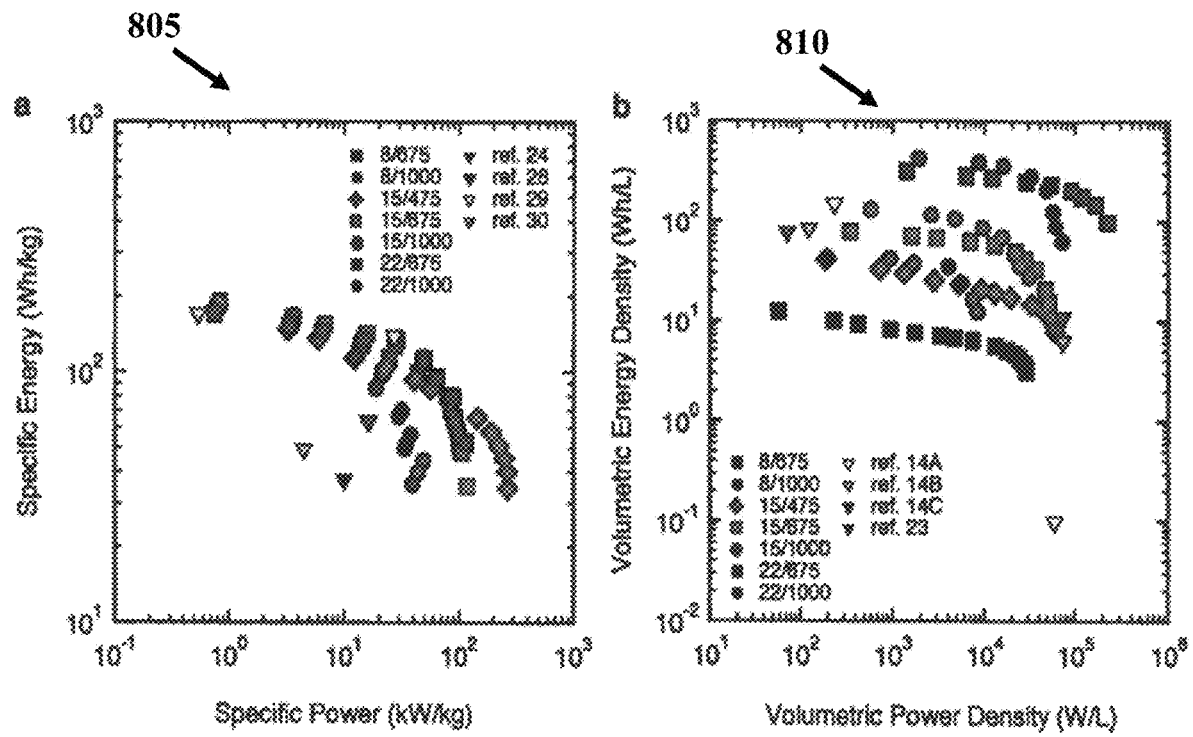
FIG. 8 depicts ragone plots for a composite electrode according to one or more embodiments.

To demonstrate how control over pore size and actual material thickness allows for tuning the electrochemical performance of electrodes, gravimetric and volumetric power and energy densities are plotted in the Ragone plots in FIG. 8. The effect of thickness of the electrolitically active material can be clearly seen in gravimetric energy and power densities. The general shape of these graphs shows a roughly constant energy density until a critical power density is reached, which is most likely the point where ion diffusion though the active layer becomes to dominate the electrochemical performance. Thus, the gravimetric performance can solely be tuned though active material thickness in some embodiments. Additionally, matching or exceeding the best values can be provided by providing at least 2× the energy density at comparable specific powers for 3 out of 4 reported values. The volumetric data demonstrates how the electrochemical performance can be tuned though both the active layer thickness and the pore diameter, which controls the amount of active material in a given volume. The electrode with the smallest pores and the thickest layer of active material (the electrode with the greatest amount of active material in a given volume) exhibits the highest volumetric energy density at low power densities. Comparing to conventional values, electrodes according to embodiments herein offer 20× the energy at high power densities and 730× power at comparable energy densities. Notably, conventional values representative of sully assembled cells, and data referenced above for the embodiments refers to the positive electrode only. In certain embodiments, better performance is provided than lithium ion batteries with an inverse opal structure and a Ni(OH)$_2$ psuedocapacitor with a foam type microstructure operating at a much wider potential window (2V and 1.8V respectively).

FIG. 8 depicts Ragone plots. Section 805 of FIG. 8 depicts gravimetric power densities of Ni/Hi(OH)$_2$ electrode in comparison to various electrode, full batteries and supercapictors. Section 810 of FIG. 8 depicts volumetric power densities of Ni/Hi(OH)$_2$ electrode in comparison to various electrode, full batteries and supercapacitors.

Figure 9:
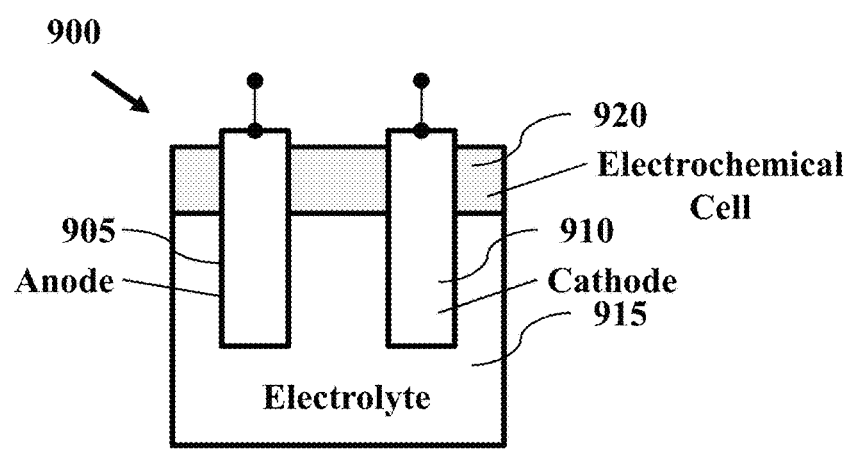
FIG. 9 depicts a graphical representation of a battery including a composite electrode according to one or more embodiments.

FIG. 9 depicts a graphical representation of a battery including a composite electrode according to one or more embodiments. According to one embodiment, a battery 900 includes an anode electrode 905, cathode 910, electrolyte 915 and electrochemical cell 920. Battery 900 may relate to a nickel metal hydride battery. According to another embodiment, cathode electrode 910 is a composite electrode having a porous structure. In on embodiment, cathode electrode 910 is a composite electrode formed by a metal structure having a uniform pore structure with a defined internal surface area per unit volume and an active material coating the metal structure. In one embodiment, thickness of the active material of cathode electrode 910 is controlled to tune the electrochemical performance of the composite electrode.

The cathode electrode 910 may include a metal structure is formed by nickel. The pore geometry and distribution of the metal structure is tuned for electrochemical performance of the composite electrode. According to another embodiment, the active material coating is Nickel/Nickel hydroxide (Ni/Ni(OH)$_2$) for cathode electrode 910. The thickness of the composite electrode of cathode 910 is within the range of about 15 μm to about 500 μm.

Battery 900 may relate to a nickel metal hydride battery, nickel air battery and batteries in general.

Figure 10:
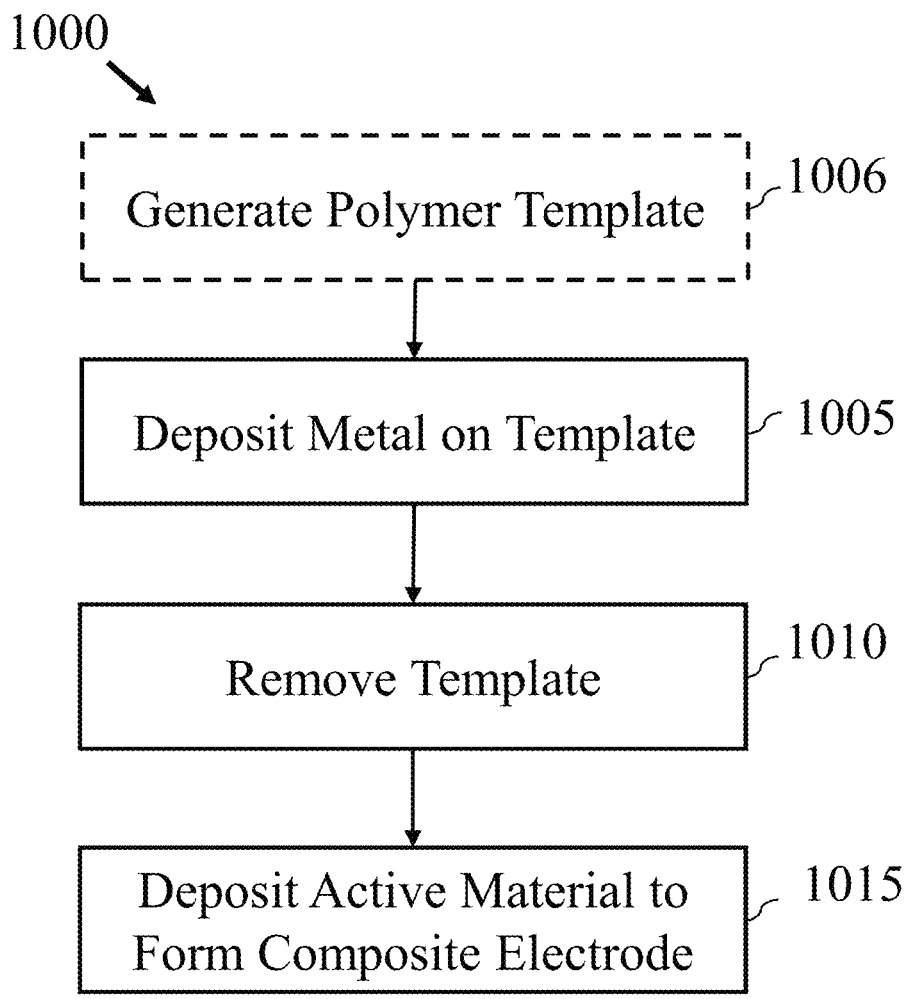
FIG. 10 depicts a process for creating a composite electrode according to one or more embodiments.

FIG. 10 depicts a process for creating a composite electrode according to one or more embodiments. According to one embodiment, process 1000 employs a polymer template. The polymer template (e.g., polymer template 505) may be formed from a bicontinuous interfacially jammed emulsion gels (e.g., bijels). According to another embodiment, the polymer template (e.g., polymer template 505) of process 1000 includes a uniform pore geometry and pore distribution.

In one embodiment, process 1000 is initiated by depositing metal (e.g., nickel, etc.) on a polymer template at block 1005. According to another embodiment, process may be initiated by generating a polymer template at optional block 1006 prior to depositing metal on the template at block 1005.

Process 1000 may include forming the polymer template with a desired pore structure prior to depositing the layer of metal material on the polymer template at block 1005. Block 1006 may include generating a polymer template by arrested phase separation of a binary liquid mixture (e.g., mixture 305) undergoing spinodal decomposition in the presence of neutrally wetting colloidal particles (e.g., particles 310). The polymer template may be formed at optional block 1006 to include a uniform pore geometry with a uniform pore distribution. In one embodiment, polymer template generation at optional block 1006 includes spinodal decomposition from one thermodynamic phase to form two coexisting phases. According to another embodiment, the spinodal decomposition is controlled to provide morphologies relevant to electrochemical applications.

The polymer template formed at optional block 1006, and/or employed in block 1005, may include a pore morphology that may be similar to a sponge. Unlike sponges which typically have pockets or voids that are randomly distributed and sometimes isolated from one another, the polymer template of process 1000 can include a uniform channel size that is continuous throughout the morphology. The pore morphology of the polymer template can allow for the internal channel size to be controlled, and process 1000 may produce this continuity through a spinodal processing of a bijel. In one embodiment, channel size can be tuned within a range between 5 μm to 550 μm. According to one exemplary embodiment, a channel size of 150 μm is typically the upper range for a composite electrode application. Channel size may be controlled by particles jammed at interfaces (e.g., see FIG. 3). The point at which particles jam can dictate the size of the channels. In one embodiment, optional block 1006 includes application of a temperature change to a gel like emulsion to create a gel with the unique microstructure.

At block 1005, process 1000 includes depositing a layer of metal material on a polymer template to form a metal coated structure. In one embodiment, the polymer template is a porous structure having a uniform pore structure with a defined internal surface area per unit volume. According to another embodiment, prior to coating and in association with coating at block 1005, silica particles may be removed from the polymer template by etching such that the template includes a polymer phase and voids. At block 1005, metal, such as nickel, is deposited on the internal surfaces of the template.

At block 1010, process 1000 includes removing polymer material from the metal coated structure to form a metal shell (e.g., metal shell 515, etc.). In one embodiment, the polymer is removed by sintering the metal coated structure to form the metal shell. For example, the coated template is put in a furnace to burn out the polymer material and scinter particles on the surface to form a hollow and very light weight high surface area. In certain embodiments, block 1010 may also include performing a reduction process on the metal shell. In one embodiment, the metal shell includes a uniform pore structure within the metal shell with an internal surface area per unit volume based on the polymer template. In one embodiment, pores of the metal shell are uniform and range from about 5 μm to about 450 μm in length. According to another embodiment, the metal shell is a nickel shell.

At block 1015, process 1000 includes depositing an active material on the metal shell to form a composite electrode (e.g., composite electrode 525, etc.). In one embodiment, thickness of the active material in the composite electrode is controlled to tune the electrochemical performance of the composite electrode. In one embodiment, active material is Nickel/Nickel Hydroxide (Ni/Ni(OH)$_2$). In one embodiment, the thickness of the active material is about 1 μm thick. Performance of the composite electrode is based on the internal surface area per unit volume and thickness of the active material deposited at block 1015. According to another embodiment, electrochemical performance of the composite electrode is governed by independent tuning of pore diameter and thickness of the active material deposited at block 1015. Block 1015 results in formation of a composite electrode which may be configured as a porous current collector in a battery (e.g., battery 900). In one embodiment, the composite electrode created by process 1000 is configured as a cathode for a nickel metal hydride battery. According to another embodiment, thickness of the composite electrode is within the range of about 15 μm to about 500 μm.

According to another embodiment, process 1000 may be directed to various chemistries beyond Nickel/Nickel Hydroxide chemistries.

While this disclosure has been particularly shown and described with references to exemplary embodiments thereof, it will be understood by those skilled in the art that various changes in form and details may be made therein without departing from the scope of the claimed embodiments However, the subject technology is not limited to the specific details set forth herein and may be practiced without these specific details. In some instances, structures and components are shown in block diagram form in order to avoid obscuring the concepts of the subject technology.

What is claimed is:

1. A method for creating a composite electrode, the method comprising:

forming a polymer template, wherein the polymer template is a bicontinuous interfacially jammed emulsion gel and wherein forming includes controlling internal surface area per unit volume;

depositing a layer of metal material on a polymer template to form a metal coated structure, wherein the polymer template is a porous structure having a uniform pore structure with a defined internal surface area per unit volume;

removing polymer material from the metal coated structure to form a metal shell, wherein the metal shell includes a uniform pore structure within the metal shell with an internal surface area per unit volume based on the polymer template; and depositing an active material on the metal shell to form a composite electrode, wherein thickness of the active material in the composite electrode is controlled to tune the electrochemical performance of the composite electrode.

2. The method of claim 1, wherein the polymer template is formed by arrested phase separation of a binary liquid mixture undergoing spinodal decomposition in the presence of neutrally wetting colloidal particles.

3. The method of claim 1, wherein the polymer template includes a uniform pore geometry with a uniform pore distribution.

4. The method of claim 1, wherein pores of the metal shell are uniform and range from about 5 μm to about 450 μm in length.

5. The method of claim 1, wherein removing the polymer includes sintering the metal coated structure.

6. The method of claim 1, wherein the metal shell is a nickel metal shell.

7. The method of claim 1, wherein the active material is Nickel/Nickel Hydroxide (Ni/Ni(OH)$_2$).

8. The method of claim 1, wherein the thickness of the active material is about 1 μm thick.

9. The method of claim 1, wherein performance of the composite electrode is based on the internal surface area per unit volume and thickness of the active material.

10. The method of claim 1, wherein electrochemical performance of the composite electrode is governed by independent tuning of pore diameter and thickness of the active material.

11. The method of claim 1, wherein the polymer template is formed by spinodal decomposition from one thermodynamic phase to form two coexisting phases and wherein pore morphology of the polymer template is controlled to generate a uniform internal channel size continuous through morphology of the template.

12. The method of claim 1, wherein the composite electrode is configured as a porous current collector.

13. The method of claim 1, wherein the composite electrode is configured as a cathode for a nickel metal hydride battery.

14. The method of claim 1, wherein thickness of the composite electrode is within the range of about 15 μm to about 500 μm.

\* \* \* \* \*